United States Patent
Giorgini

[11] Patent Number: 5,852,331
[45] Date of Patent: Dec. 22, 1998

[54] WIND TURBINE BOOSTER

[76] Inventor: Roberto Giorgini, P.O. Box 2051, St. Maarten, Netherlands Antilles

[21] Appl. No.: 667,405

[22] Filed: Jun. 21, 1996

[51] Int. Cl.$^6$ .................................................. F03D 3/04
[52] U.S. Cl. ............................. 290/55; 290/44; 415/4.2; 415/4.4
[58] Field of Search .................... 290/43, 44, 54, 290/55; 415/4.2, 4.4, 907; 416/197 A

[56] References Cited

U.S. PATENT DOCUMENTS

| | | |
|---|---|---|
| 1,595,578 | 8/1926 | Sovereigh . |
| 3,938,907 | 2/1976 | Magoveny et al. ............... 415/141 |
| 4,031,405 | 6/1977 | Asperger ........................... 290/55 |
| 4,039,849 | 8/1977 | Mater et al. ...................... 290/55 |
| 4,086,498 | 4/1978 | Szoeke ............................. 290/55 |
| 4,318,019 | 3/1982 | Teasley et al. ................... 310/156 |
| 4,508,973 | 4/1985 | Payne ............................... 290/55 |
| 4,551,631 | 11/1985 | Trigilio ........................... 290/55 |
| 4,764,683 | 8/1988 | Coombes .......................... 290/55 |
| 5,038,049 | 8/1991 | Kato ................................ 290/55 |
| 5,391,926 | 2/1995 | Staley et al. .................... 290/55 |
| 5,457,346 | 10/1995 | Blumberg et al. ................ 290/55 |
| 5,664,418 | 9/1997 | Walters ............................ 60/398 |

*Primary Examiner*—Clayton E. Laballe
*Assistant Examiner*—Nicholas Ponomarenko
*Attorney, Agent, or Firm*—Michael I. Kroll

[57] ABSTRACT

A booster (34) for a wind turbine (12) of the type containing an impeller (14) having a plurality of radial curved vanes (16) mounted on a shaft (18) connected to an electric generator (20). The booster (34) comprises a structure (36) mounted in a stationary manner about the impeller (14) for increasing rotation speed of the radial curved vanes (16) on the shaft (18) and operate more efficiently the electric generator (20), to put out more electrical energy therefrom.

15 Claims, 2 Drawing Sheets

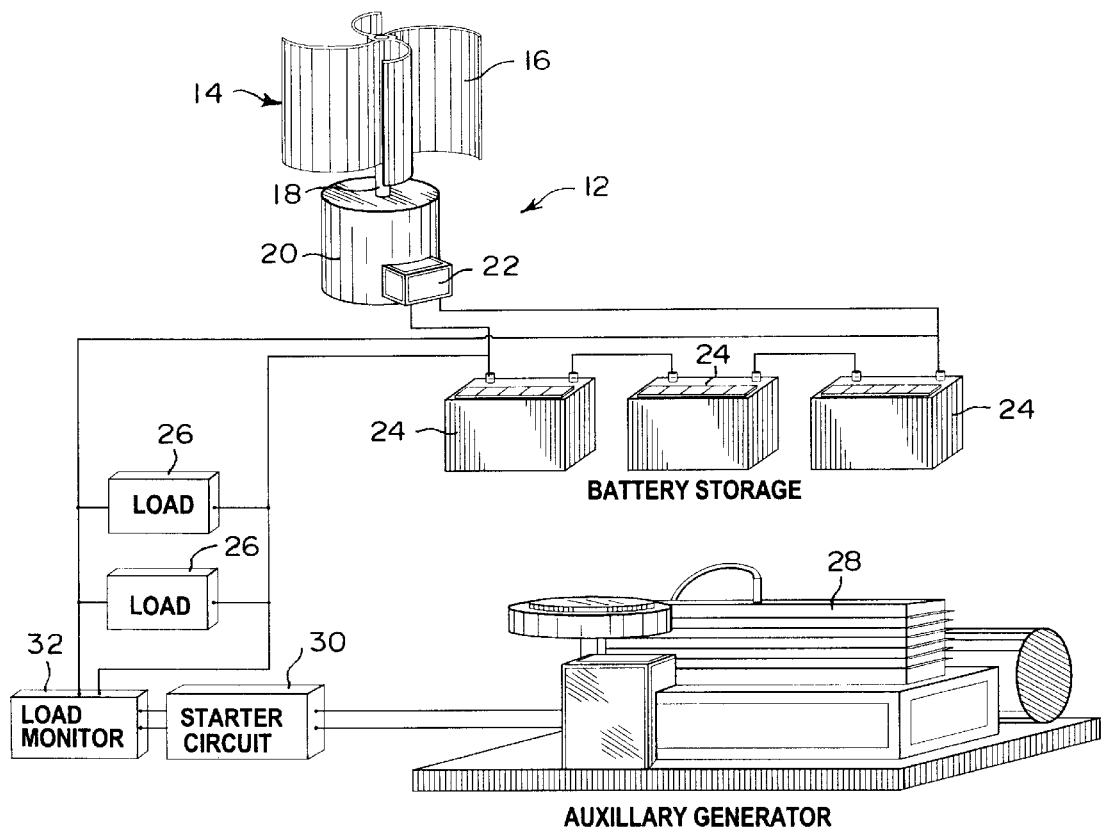
FIG 1A
(PRIOR ART)
FIG 1
(PRIOR ART)
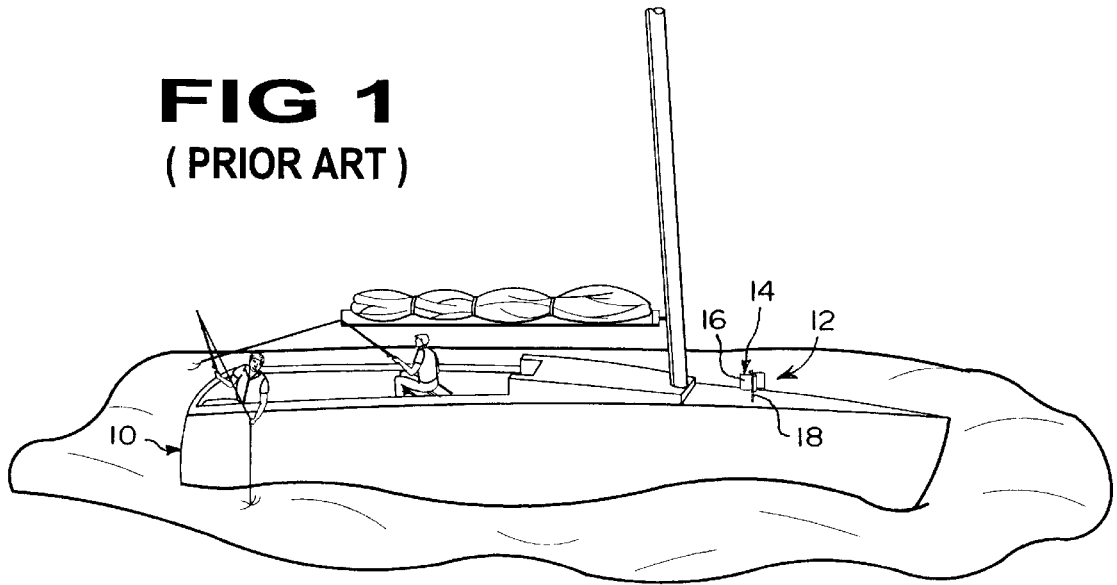

WIND TURBINE BOOSTER

BACKGROUND OF THE INVENTION

1. Field of the Invention
The instant invention relates generally to wind operated electric generator systems and more specifically it relates to a wind turbine booster.

2. Description of the Prior Art
Numerous wind operated electric generator systems have been provided in prior art. For example U.S. Pat. Nos. 4,086,498 to Szoeke; 4,508,973 to Payne; 4,764,683 to Coombes and 5,457,346 to Blumberg et al. all are illustrative of such prior art. While these units may be suitable for the particular purpose to which they address, they would not be as suitable for the purposes of the present invention as heretofore described.

A machine and method for converting the wind's linear force to electricity, comprising of a rotor, walled at both inner and periphery radiuses, encircled by a periphery deflector and its inner radius covered with a core deflector. Tapping means attached to the back planar base of its plurality of rotor vanes and rotatably associated with plurality of reciprocating generators. Rotation speed and generating electricity regulated by operating means, mounted to its axis.

A wind-operated electric generator system of simple design including a stationary circular arrangement of segmental wind inlet passages extending around a vertical axis and having vertical inlet openings at the outer ends. The inlet openings having inwardly and upwardly curving walls extending from the inlet openings toward the central axis. The lower walls sloping upwardly an appreciably greater extent than the upper walls to form an inwardly and upwardly extending convergence with the inner portions of the upper walls to form constricted upwardly directed exit passages that merge into a Venturi throat. A bladed impeller is mounted upon a vertical shaft which is connected to an electric generator. The sides of the segmental inlet passages also converging toward the central axis and cooperating with the converging upper and lower walls to form an efficient Venturi effect to increase the speed of air currents directed to the impeller.

An improved wind powered generator includes a streamlined housing rotatably connected with a fixed base and a pair of helical rotors rotatably connected with the housing for driving a pair of electric generators when the rotors are rotated by the wind. The housing includes forward and rear nacelles which define vertical side openings in the housing in which the rotors are arranged, with the helical vanes thereof partially protruding from the housing. the nacelles serve to direct the wind stream against the rotor vanes with minimal disturbance, whereby the helical rotors capture the maximum amount of kinetic energy from the wind for conversion to electricity.

An accelerator for a windmill structure as described which is a frustro-conical funnel-like device intended to direct a stream of wind therethrough onto the impeller of a windmill. As the wind passes through the device, it is constricted whereby the velocity increases and exits a throatlike outlet as a diverging jet impacting the impeller blades to thereby increase the kinetic energy available to be converted to mechanical or electrical energy by the windmill. The device of this invention can include a vane for maintaining the accelerator facing into the wind with the windmill, a mounting platform for either the accelerator or both accelerator and the windmill, and an internal configuration to the accelerator to impart a swirling spiral motion to the wind passing therethrough as it is constricted.

SUMMARY OF THE INVENTION

A primary object of the present invention to is provide a wind turbine booster that will overcome the shortcomings of the prior art devices.

Another object is to provide a wind turbine booster that is mounted in a stationary manner about an impeller of a wind turbine to increase the rotation speed of the impeller making the wind turbine more powerful.

An additional object is to provide a wind turbine booster that will direct the wind into a condensed spiraling force towards the vanes of the impeller, so that the impeller will get a much higher rotation to operate an electric generator, so as to put out more electrical energy therefrom.

A further object is to provide a wind turbine booster that is simple and easy to use.

A still further object is to provide a wind turbine booster that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a perspective view of the prior art being a water craft with a wind turbine system mounted therein.

FIG. 1A is a perspective view of the prior art wind turbine system used in the water craft in FIG. 1.

Similar reference characters denote corresponding features consistently throughout the attached drawings.

DETAILED DESCRIPTION OF THE PREFERRED EMBODIMENTS

Figure 3:
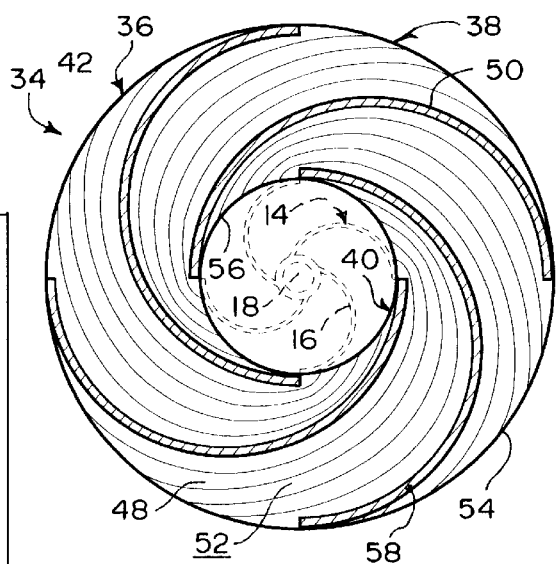
FIG. 3 is a cross sectional view taken along line 3–3 in FIG. 2.

Turning now descriptively to the drawings, in which similar reference characters denote similar elements throughout the several views, FIGS. 1 and 1A illustrate the prior art. FIG. 1 shows a water craft 10 with a wind turbine 12 mounted therein. The wind turbine 12, as shown in FIG. 1A, consists of an impeller 14 having a plurality of radial curved vanes 16 mounted on a shaft 18 connected to an electric generator 20. The electric generator 20 has a connector 22 that is electrically connected to a plurality of storage batteries 24, which in turn operate loads 26 that are electrical equipment. An auxiliary generator 28 is connected to a starter circuit 30, which is connected to a load monitor 32 which will operate the loads 26 as a back up system when the wind turbine 12 is not operating.

Figure 2:
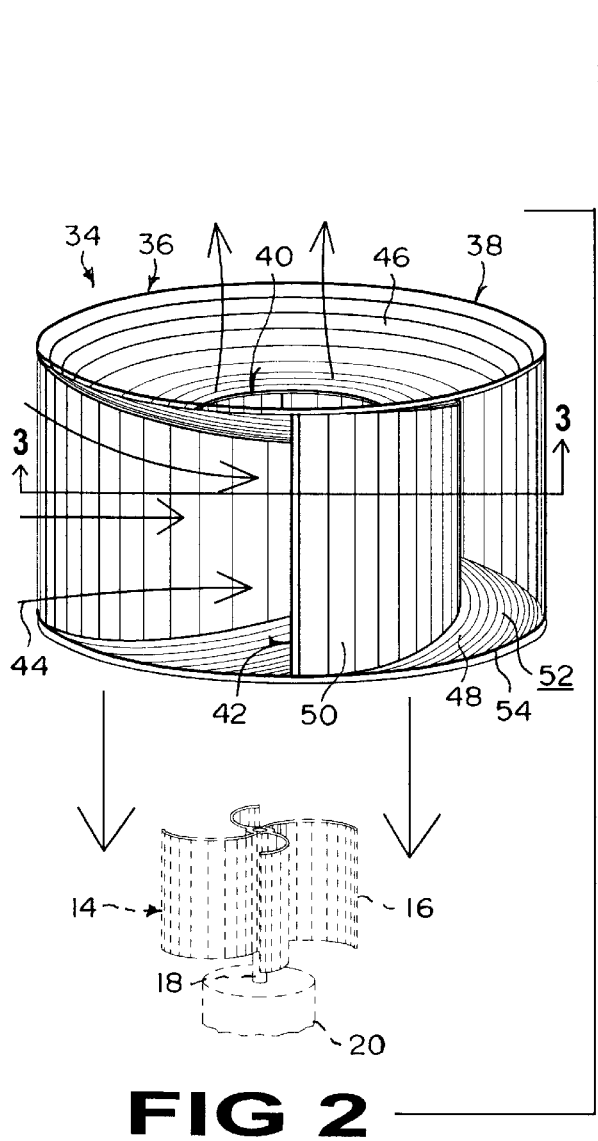
FIG. 2 is a perspective view of the instant invention ready to be placed over the impeller of the wind turbine.
Figure 4:
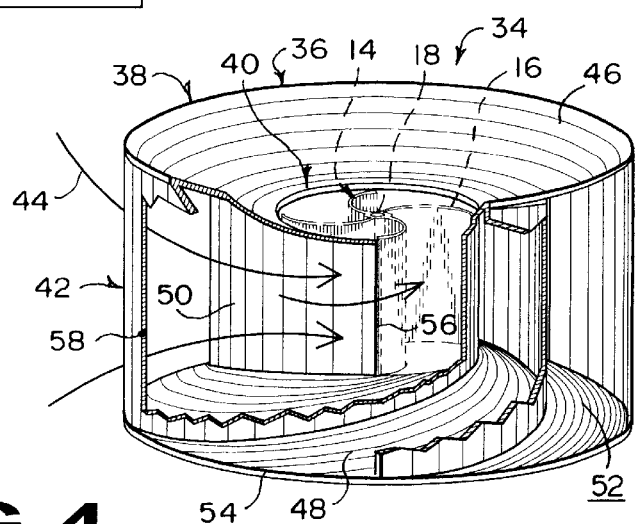
FIG. 4 is a perspective view similar to FIG. 2, showing the instant invention placed over the impeller of the wind turbine, with the parts broken away and in section showing the internal structure thereof.

The instant invention, as shown in FIGS. 2 to 4, is a booster 34 for the wind turbine 12. The booster 34 comprises a structure 36 mounted in a stationary manner about the impeller 14 for increasing rotation speed of the radial curved vanes 16 on the shaft 18 and operate more efficiently the electric generator 20, to put out more electrical energy therefrom.

The rotation increasing structure 36 includes a generally cylindrical housing 38, having a central core opening 40 to receive the impeller 14 therein in a rotatable manner. A facility 42 in the housing 38 is for directing wind 44 in a condensed spiraling force towards the central core 40, so that the vanes 16 of the impeller 14 will rotate much faster.

The wind directing facility 42 consists of a top wall 46 that is downwardly tapered towards the central core opening 40 in the housing 38. A bottom wall 48 is also provided, that is upwardly tapered towards the central core opening 40 in the housing 38. A plurality of spiral vertical walls 50 are diverging and terminating at the central core opening 40 in the housing 38.

The spiral vertical walls 50 split u the housing 38 into a plurality of wind passageways 52 extending spiraling around the central core opening 40 in the housing 38. Each wind passageway 52 has a large wind inlet port 54 at external perimeter of the housing 38. Each wind passageway 52 also has a small wind outlet port 56 at the central core opening 40 in the housing 38.

The housing 38 and the wind directing facility 42 are fabricated out of a strong durable material 58. The strong durable material 38, as shown in the drawings, is metal. The strong durable material 38 can be made out of other types of matter, such as plastic, a composite, hard rubber, etc. (not shown).

OPERATION OF THE INVENTION

To use the booster 34 for the wind turbine 12, the following steps should be taken:

1. Place the housing 38 over the impeller 14, so that the central core opening 40 extends about the impeller 14.
2. Secure the housing 38 in a stationary manner, so that the impeller 14 can rotate freely within the central core opening 40.
3. The wind 44 can come from any direction and enter any one of the large wind inlet ports 54.
4. The wind 44 will travel down the respective wind passageway 52 between two spiral vertical walls 50, the top wall 46 and the bottom wall 48.
5. The wind 44 will now exit at a faster rate out of the small wind outlet port 56 in the central core opening 40.
6. The vanes 16 will now rotate faster on the shaft 18 to operate the electric generator 20 more efficiently, thereby producing more electricity for the storage batteries 24.

LIST OF REFERENCE NUMBERS

| | LIST OF REFERENCE NUMBERS |
|---|---|
| 10 | water craft |
| 12 | wind turbine (prior art) on 10 |
| 14 | impeller of 12 |

-continued

| | LIST OF REFERENCE NUMBERS |
|---|---|
| 16 | radial curved vane of 14 |
| 18 | shaft of 12 |
| 20 | electric generator of 12 |
| 22 | connector on 20 |
| 24 | storage battery |
| 26 | load (electrical equipment) |
| 28 | auxiliary generator |
| 30 | starter circuit |
| 32 | load monitor |
| 34 | booster |
| 36 | rotation increasing structure of 34 |
| 38 | generally cylindrical housing of 36 |
| 40 | central core opening of 38 |
| 42 | wind directing facility of 36 |
| 44 | wind |
| 46 | top wall downwardly tapered of 42 |
| 48 | bottom wall upwardly tapered of 42 |
| 50 | spiral vertical wall of 42 |
| 52 | wind passageway in 38 |
| 54 | large wind inlet port of 52 |
| 56 | small wind outlet port of 52 |
| 58 | strong durable material for 38 and 42 |

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A booster for a wind turbine of the type containing an impeller having a plurality of radial curved vanes mounted on a shaft connected to an electric generator, wherein wind directed at the vanes cause the vanes and shaft to rotate and thereby supply energy to power the electric generator causing the electric generator to convert the energy received from the wind turbine to electrical energy for output therefrom, said booster comprising means mounted in a stationary manner about the impeller for increasing a speed of rotation of the radial curved vanes on the shaft and thereby causing the electric generator to increase an amount of electrical energy output therefrom, said means for increasing a speed of rotation including:

a) a generally cylindrical housing having a central core opening to receive the impeller therein in a rotatable manner; and b) means, in said housing, for directing wind in a condensed spiralling force towards said central core causing said speed of rotation of the radial curved vanes of the impeller to increase, said wind directing means includes a top wall downwardly tapered towards said central core opening in said housing.

2. A booster for a wind turbine as recited in claim 1, wherein said wind directing means includes a plurality of spiral vertical walls diverging and terminating at said central core opening in said housing.

3. A booster for a wind turbine as recited in claim 2, wherein said spiral vertical walls split up said housing into a plurality of wind passageways extending spiraling around said central core opening in said housing.

4. A booster for a wind turbine as recited in claim 3, wherein each said wind passageway having a large wind inlet port at external perimeter of said housing.

5. A booster for a wind turbine as recited in claim 3, wherein each said wind passageway having a small wind outlet port at said central core opening in said housing.

6. A booster for a wind turbine as recited in claim 1, wherein said housing and said wind directing means are fabricated out of a strong durable material.

7. A booster for a wind turbine as recited in claim 6, wherein said strong durable material is metal.

8. A booster for a wind turbine as recited in claim 1, wherein said wind directing means includes a bottom wall upwardly tapered towards said central core opening in said housing.

9. A booster for a wind turbine as recited in claim 1, wherein said wind directing means includes a plurality of spiral vertical walls diverging and terminating at said central core opening in said housing.

10. A booster for a wind turbine as recited in claim 9, wherein said spiral vertical walls split up said housing into a plurality of wind passageways extending spiraling around said central core opening in said housing.

11. A booster for a wind turbine as recited in claim 10, wherein each said wind passageway having a large wind inlet port at external perimeter of said housing.

12. A booster for a wind turbine as recited in claim 11, wherein each said wind passageway having a small wind outlet port at said central core opening in said housing.

13. A booster for a wind turbine as recited in claim 12, wherein said housing and said wind directing means are fabricated out of a strong durable material.

14. A booster for a wind turbine as recited in claim 13, wherein said strong durable material is metal.

15. A booster for a wind turbine of the type containing an impeller having a plurality of radial curved vanes mounted on a shaft connected to an electric generator, wherein wind directed at the vanes cause the vanes and shaft to rotate and thereby supply energy to power the electric generator causing the electric generator to convert the energy received from the wind turbine to electrical energy for output therefrom, said booster comprising means mounted in a stationary manner about the impeller for increasing a speed of rotation of the radial curved vanes on the shaft and thereby causing the electric generator to increase an amount of electrical energy output therefrom, said means for increasing rotation including:

a) a generally cylindrical housing having a central core opening to receive the impeller therein in a rotatable manner; and b) means in said housing, for directing wind in a condensed spiralling force towards said central core causing said the speed of rotation of the radial curved vanes of the impeller to increase said wind directing means includes a bottom wall upwardly tapered towards said central core opening in said housing.

* * * * *